United States Patent [19]
Ramsay

[11] Patent Number: 5,984,627
[45] Date of Patent: Nov. 16, 1999

[54] SEAL/BEARING APPARATUS

[75] Inventor: Thomas W. Ramsay, Kitchener, Canada

[73] Assignee: A.W. Chesterton Co., Stoneham, Mass.

[21] Appl. No.: 08/973,849

[22] PCT Filed: Apr. 29, 1997

[86] PCT No.: PCT/CA97/00282

§ 371 Date: Dec. 19, 1997

§ 102(e) Date: Dec. 19, 1997

[87] PCT Pub. No.: WO97/41372

PCT Pub. Date: Nov. 6, 1997

[30] Foreign Application Priority Data

Apr. 30, 1996 [GB] United Kingdom .................. 9608901
Jun. 17, 1996 [GB] United Kingdom .................. 9612845

[51] Int. Cl.⁶ ........................................ F16J 15/40
[52] U.S. Cl. ...................... 415/112; 415/113; 384/110
[58] Field of Search .................... 415/110, 111, 415/112, 113, 229; 384/110, 124

[56] References Cited

U.S. PATENT DOCUMENTS

| | | | |
|---|---|---|---|
| 1,083,838 | 1/1914 | Key ........................................ | 384/110 |
| 1,884,974 | 10/1932 | Hurd ..................................... | 415/229 X |
| 2,266,107 | 12/1941 | Waterfill ................................ | 415/112 |
| 2,569,563 | 10/1951 | Grantham .............................. | 415/113 X |
| 3,469,895 | 9/1969 | Vandersteen .......................... | 384/110 |
| 3,558,238 | 1/1971 | van Herpt ............................. | 415/112 X |
| 3,964,805 | 6/1976 | Schulien ................................ | 384/399 |
| 4,260,205 | 4/1981 | Spies ..................................... | 384/109 |
| 4,776,229 | 10/1988 | Zona ..................................... | 384/124 X |
| 4,826,325 | 5/1989 | Iwata et al. .......................... | 384/110 X |
| 4,883,367 | 11/1989 | Maruyama ............................ | 384/112 X |
| 5,125,792 | 6/1992 | Korenblit .............................. | 415/110 X |
| 5,246,294 | 9/1993 | Pan ....................................... | 384/110 X |
| 5,618,115 | 4/1997 | Yates ..................................... | 384/110 |
| 5,827,042 | 10/1998 | Ramsay ................................. | 415/112 |
| 5,873,657 | 2/1999 | Lee ........................................ | 384/110 |

FOREIGN PATENT DOCUMENTS

| | | | |
|---|---|---|---|
| 262551 | 1/1970 | Russian Federation ............... | 384/110 |
| 982309 | 2/1965 | United Kingdom ................... | 384/124 |
| WO 95/35457 | 12/1995 | WIPO . | |

*Primary Examiner*—John E. Ryznic
*Attorney, Agent, or Firm*—Rockey, Milnamow & Katz, Ltd.

[57] ABSTRACT

In a seal or bearing that uses the tapered-sleeves-with-spiral-groove technology, the capacity is increased, without increasing the space envelope, by folding the tapered surfaces. Double and triple folding is illustrated. The seal/bearing may be used in e.g. a rotary impeller pump, or as a big-end bearing.

28 Claims, 7 Drawing Sheets

5,984,627

1

SEAL/BEARING APPARATUS

This invention relates to seals and bearings for rotary shafts, and is particularly suitable for use in motor-driven centrifugal pumps.

BACKGROUND OF THE INVENTION

This invention relates to developments of the technology described in patent publication number WO-95/35457 also U.S. Pat. No. 5,827,042.

The technology provides a combined seal and bearing assembly apparatus, comprising a stator and rotor adapted for rotation about an axis. The apparatus may be installed in place of the stuffing box of a centrifugal pump.

The rotor and the stator components are formed with complementary bearing-surfaces, which are so arranged as to sweep each other in a hydro-dynamic-bearing relationship, over an area termed the bearing area. One of the bearing-surfaces is formed with a groove, which extends in a spiral configuration along and around the bearing-surface, over the bearing area. The spiral-groove comprises several turns extending over the bearing-surface, the arrangement thereof being such as to leave lands of substantial width between adjacent turns of the spiral-groove. The spiral-groove has an entry-mouth and an exit-mouth.

The apparatus is so structured as to define an entry-chamber and an exit-chamber, being chambers which are in fluid-conveying-communication with the entry-mouth and the exit-mouth respectively, and the apparatus includes a means for conveying a barrier-liquid into the entry-chamber, and away from the exit-chamber. When the apparatus is driven in rotation, the barrier-liquid flows along the spiral-groove from the entry-mouth to the exit-mouth.

The apparatus is so structured that the fit of the bearing-surfaces is a tight running clearance, the clearance or gap between the surfaces being small enough, and the land width between the turns being wide enough, to ensure the establishment and continuance of a hydro-dynamic film between the bearing-surfaces. The bearing surfaces are conically tapered, and either the rotor or the stator is made axially movable into and out of the taper.

SUMMARY OF THE INVENTION

In the tapered-sleeve-with-spiral-groove type of rotary interaction device, or seal/bearing apparatus, as shown in WO-95/35457, a single tapered sleeve interface was illustrated. The present invention provides a folded tapered sleeve, in which the axial length of the seal/bearing assembly is small, but the aggregate interface area is large. The manner in which the folded tapered interface can be put into practice, and utilised to advantage, is explained below.

DESCRIPTION OF PREFERRED EMBODIMENTS

By way of further explanation of the invention, exemplary embodiments of the invention will now be described with reference to the accompanying drawings, in which.

2

Figure 2A:
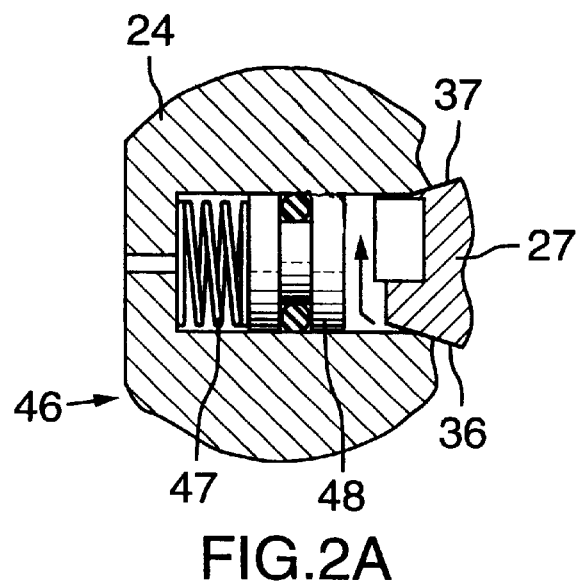
FIG. 2 is a cross-section of another rotary impeller pump, having a folded tapered sleeve arrangement which embodies the invention.
Figure 2:
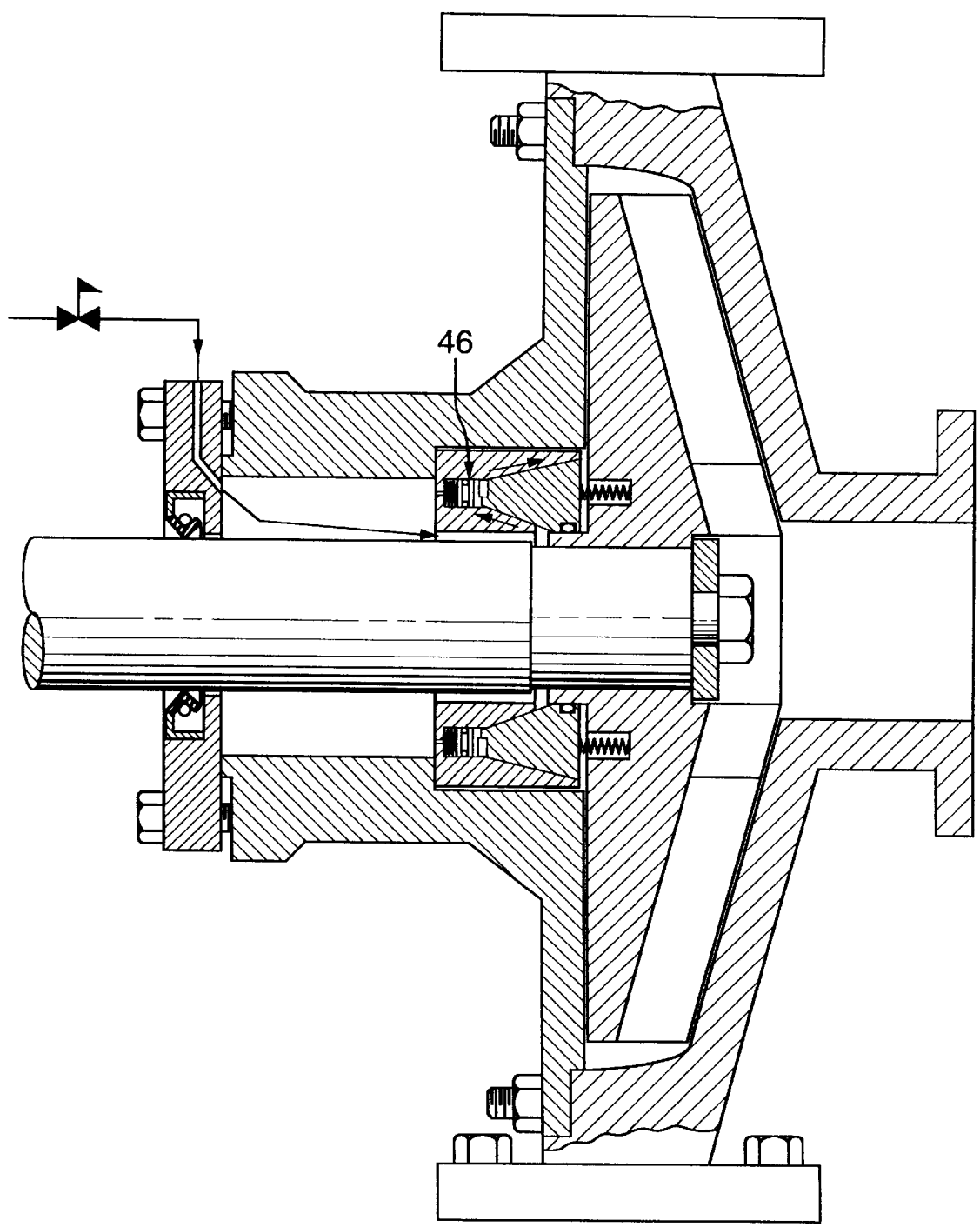
Figure 3:
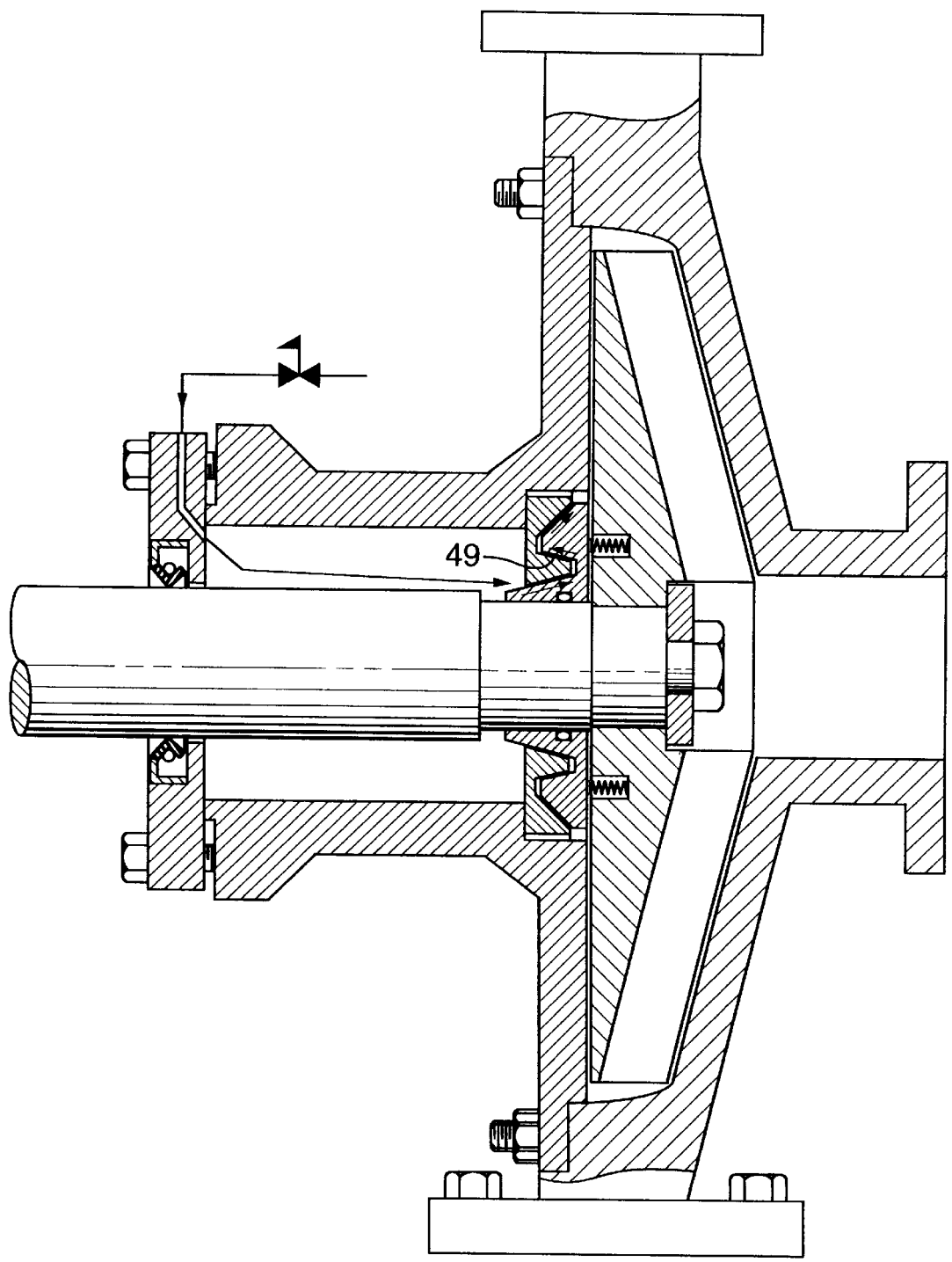
Figure 3A:
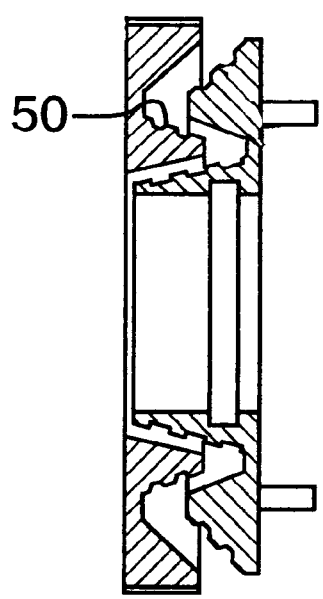
Figure 6:
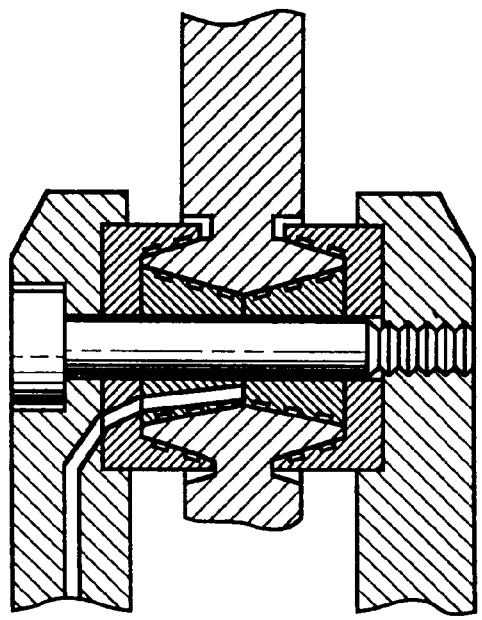
Figure 4:
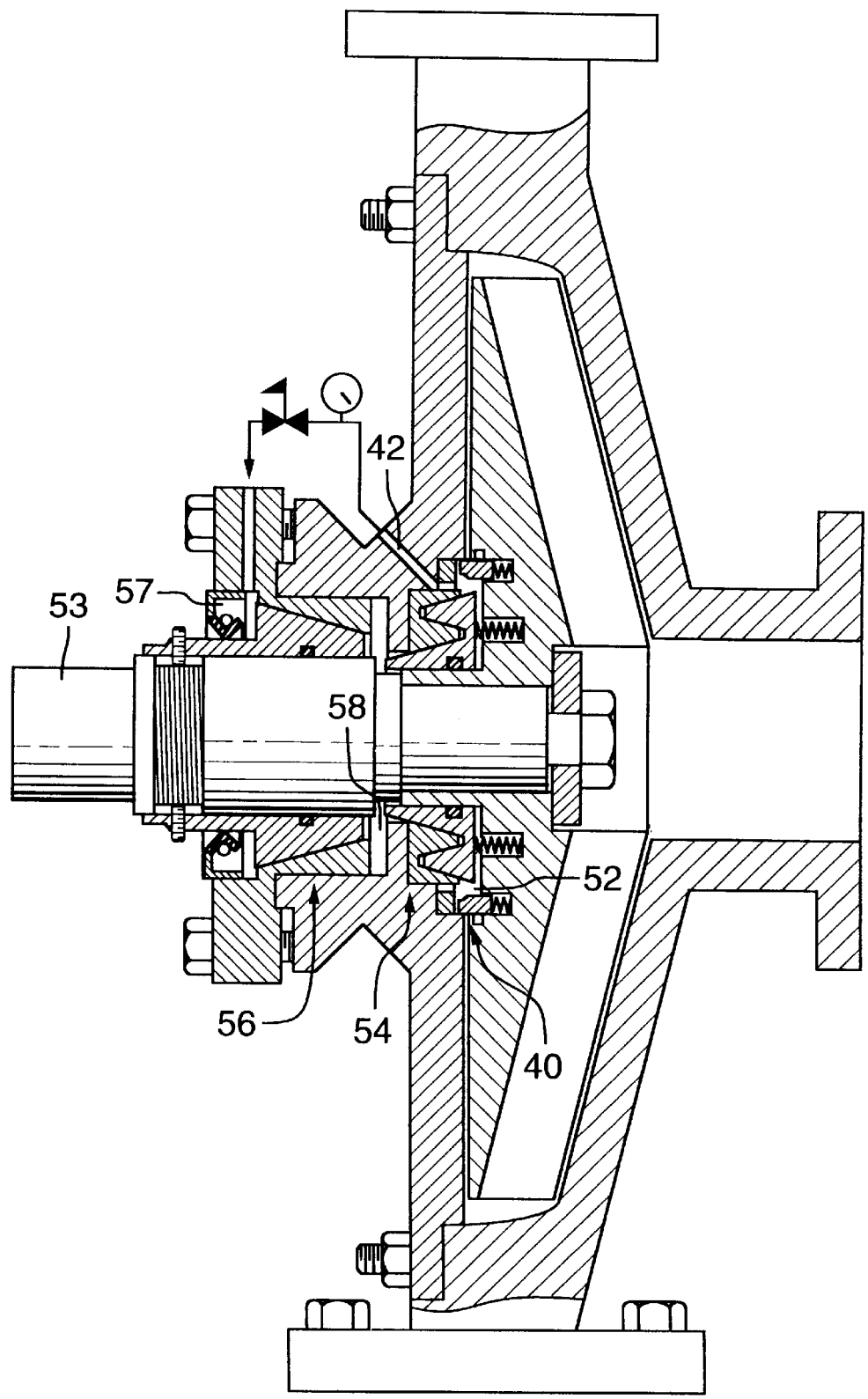
Figure 5:
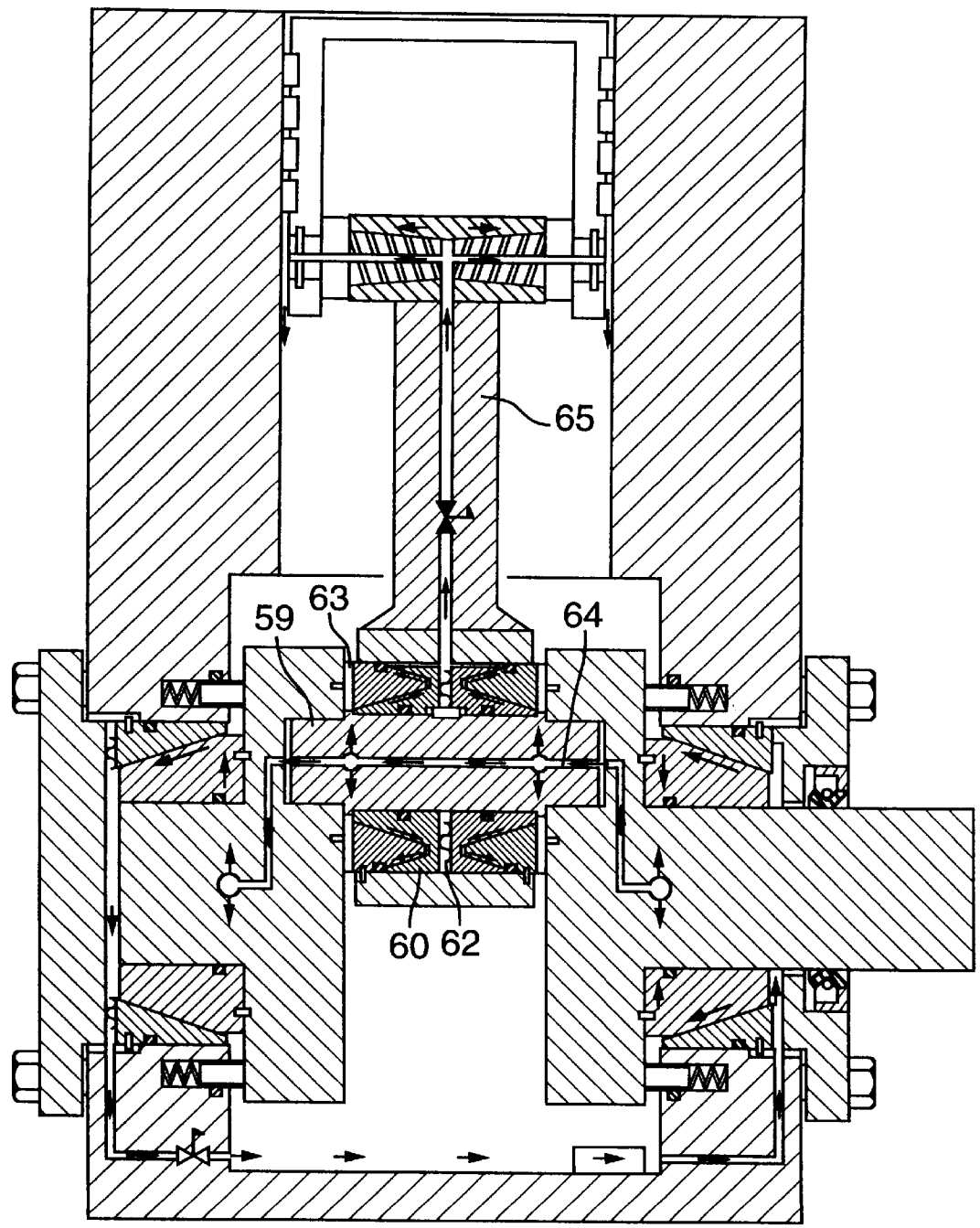

FIG. 2a is a close-up of an area of FIG. 2;

FIG. 3 is a cross-section of another rotary impeller pump, having a folded tapered sleeve arrangement which embodies the invention;

FIG. 3a is a cross-sectional view of the folded sleeve components of the pump of FIG. 3;

FIG. 4 is a cross-section of another rotary impeller pump, having a folded tapered sleeve arrangement which embodies the invention;

FIG. 5 is a cross-sectional view of a compressor, having bearings in the form of a folded tapered sleeve arrangement which embodies the invention;

FIG. 6 is a cross-sectional view of a portion of another compressor which embodies the invention.

The apparatuses shown in the accompanying drawings and described below are examples which embody the invention. It should be noted that the scope of the invention is defined by the accompanying claims, and not necessarily by specific features of exemplary embodiments.

Figure 1:
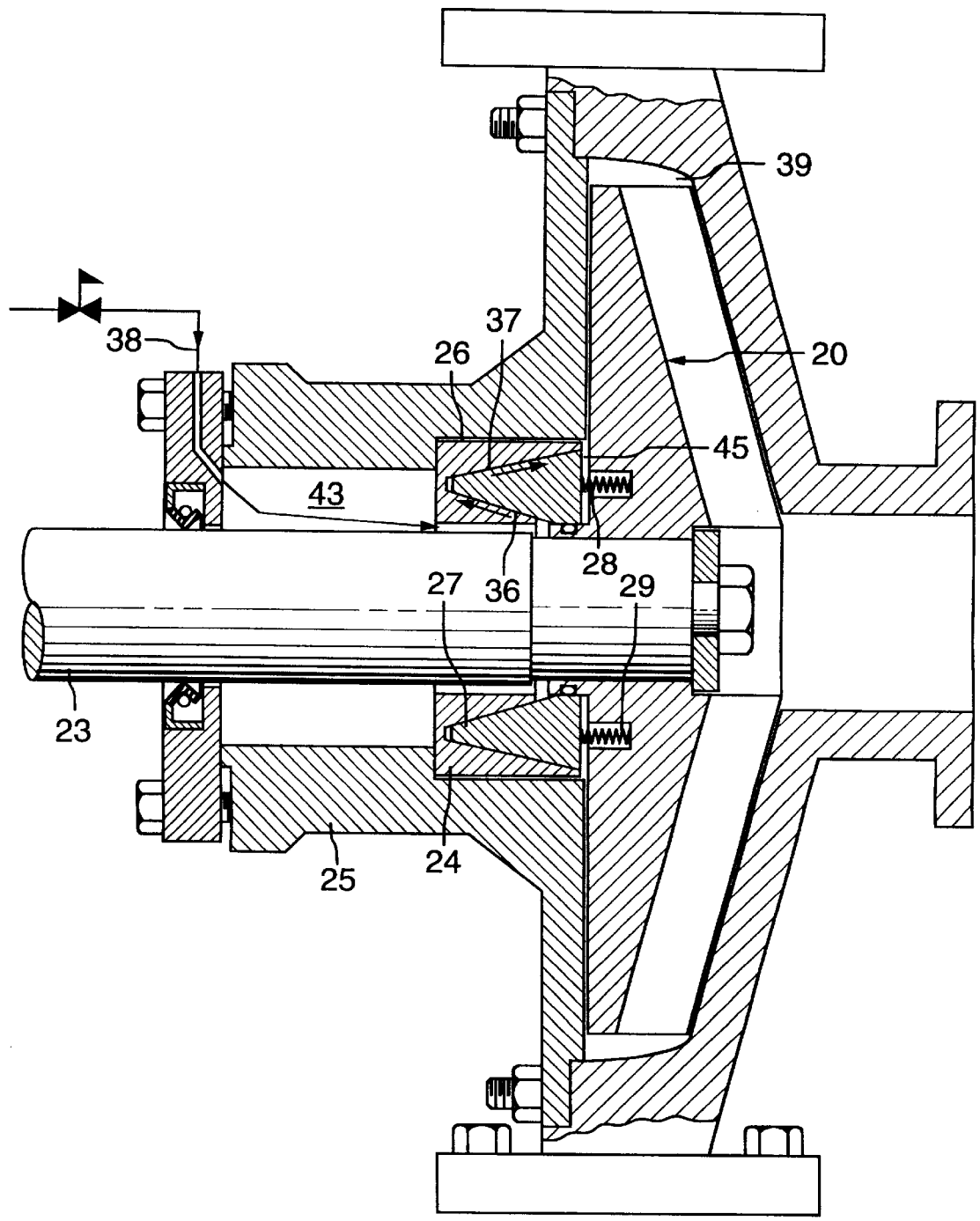
FIG. 1 is a cross-section of a rotary impeller pump, having a folded tapered sleeve arrangement which embodies the invention.

FIG. 1 shows a rotary impeller pump, in which the impeller 20 is mounted on a drive-shaft 23. The shaft 23 is guided in bearings, which are situated in a bearing box (not shown), to the left in FIG. 1.

A stator sleeve 24 is fitted into the fixed housing 25 of the pump. The stator sleeve is a tight fit in the housing 25 by virtue of an elastomeric bushing 26 surrounding the stator sleeve. A rotor sleeve 27 is mounted on the impeller 20, and is driven with the impeller 20 by means of drive pins 28. Springs 29 load the rotor sleeve 27 to the left, and thus load the rotor and stator sleeves together.

Figure 1A:
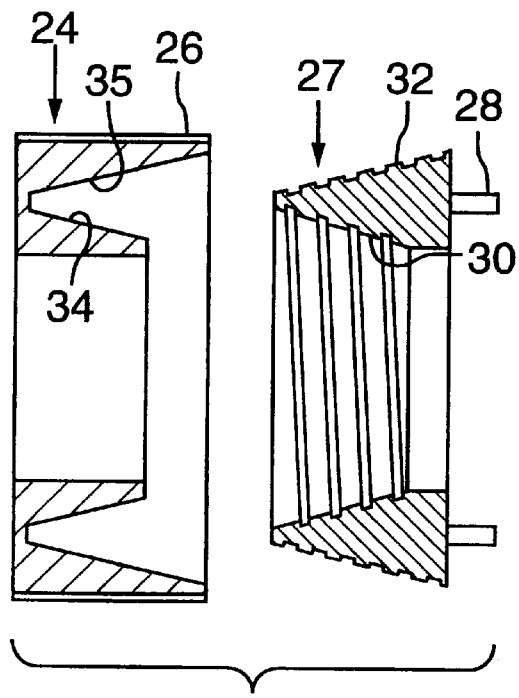
FIG. 1a is a cross-sectional view of the folded sleeve components of the pump of FIG. 1.

The rotor sleeve is formed with first and second interface surfaces 30 and 32, and the stator sleeve is formed with complementary first and second interface surfaces 34 and 35 (FIG. 1a). These form first and second bearing interfaces 36 and 37, between the rotor and stator. Spiral grooves are formed into the first and second surfaces of the rotor, as shown in FIG. 1a, separated by plane lands of substantial width, in the manner of this technology as described above in connection with WO-95/35457, and also U.S. Pat. No. 5,827,042.

In FIG. 1, barrier liquid is supplied at a reservoir 38, and is drawn into the sleeves area from the left. When the shaft rotates, the barrier-liquid is driven by the spiral grooves in the direction as shown by the arrows, thus being drawn from an entry chamber 43, supplied by reservoir 38, into the open mouth of the groove communicating therewith (the entry mouth) and conducted therealong until discharged from the open mouth (the exit mouth) at the flow end of that groove, only to then be drawn into the open mouth of the following groove and conducted therealong until discharged from the open mouth (exit mouth) of that groove communicating with an exit chamber 45 behind the impeller. The pressurised barrier liquid occupies the interface as a hydrodynamic film, and prevents the escape of process fluid from the process chamber 39 of the pump.

Thus, in FIG. 1, the barrier liquid is pumped into the process-fluid. The barrier liquid is selected as being compatible with the process fluid, and it may be noted that the spiral-groove-tapered-sleeve arrangement generally operates satisfactorily even when the barrier liquid is water, or water-based. In cases where it is not acceptable to pump barrier liquid into the process fluid, a mechanical seal 40 may be provided, as shown in FIG. 4. Now, the pumped barrier liquid is collected, at 42, and recirculated.

The rotor and stator tapered sleeves 27 and 24 are lapped together during manufacture, so that very intimate contact obtains over both of the two interface surfaces. The pumping action of the spiral groove, for creating pressure in the barrier liquid, depends on the aggregate length of the groove, and folding the taper, as shown, means that a good pumping length of the spiral groove, as well as a good bearing area, can be accommodated in a small axial space. The interfaces between the sleeves can serve as a bearing, whereby the shaft 23 is supported right at, and hard against, the impeller. Even though the aggregate axial length of the interfaces is long (i.e 36 and 37 in FIG. 1), the bearing could hardly be closer to the impeller, and the tapered sleeves accordingly provide a very highly satisfactory bearing for supporting the overhang of the (heavy) impeller on the shaft 23. So much so, that the shaft can be of a significantly smaller diameter as compared with the size of shaft needed on a conventional pump. Also, the designer need not worry about how far the impeller overhangs, and can move the shaft bearings even further to the left, if that would be beneficial to provide room for assembly etc.

The spiral grooves are handed such that the pumping action attributable to the grooves follows the arrows during normal rotation. (The groove action would not work if the pump were run in reverse.) Pressure builds up progressively with each turn of the grooves, being minimum at the entry mouth of the first groove, i.e in the entry chamber 43, and a maximum at the point where the exit mouth opens into the exit chamber 45 (which in FIG. 1 communicates with the process chamber 39).

Sometimes, it can be advantageous to ensure that pressure builds up in at least one of the interfaces, even if process pressure is very low. FIG. 2 shows the provision of a pressure relief valve 46. The valve remains closed unless the pressure built up by the inner interface 36 exceeds the biassing spring 47 acting on the movable valve member 48. FIG. 2a shows a close-up of the valve 46.

In cases where it is desired to make the bearing of even less axial length, and to place the bearing even closer to the impeller, the sleeve interface may be folded into three, as shown in FIG. 3. FIG. 3a shows the rotor and stator sleeves. Again, the interfaces are lapped together as a matched pair during manufacture. With reference to FIGS. 3 and 3a, the middle interface 49 of the three has the spiral groove formed in the middle face 50 of the stator, not in the rotor. Putting the groove in the stator is not preferred, but can find application in some cases.

In FIG. 3, it may be noted also that although all three interfaces are right-conical in form, they do not all have the same cone angle. This can be advantageous in some cases, in that, as the sleeves separate (slightly) and come together, the thickness of the film changes; the benefit of this is that in a critical installation, where the film might be subject to breaking down, at least the three films at the three interfaces will be of different thickness, and hence would be unlikely to break down all at the same time. Thus, the different cone angles of the interfaces, and hence the different thickness of hydrodynamic film, during running, can serve to prevent breakdown of the film, and touching of the metal surfaces under extreme conditions, and can serve to re-establish a film if breakdown should occur momentarily.

Because the bearing effect of the double or triple folded tapered sleeve unit is positioned directly on or in the impeller, the shaft only needs to transmit torque, and, in comparison to conventional impeller pumps, is hardly subject at all to bending moments and other shaft stresses, and therefore the diameter of the shaft can be small. In FIG. 1, the rotor sleeve is mounted directly on the impeller, and in FIG. 3 the rotor sleeve is mounted on the shaft, close to the impeller. Both arrangements benefit from the small axial extent of the sleeves, as shown.

As mentioned, pumping the barrier liquid into the process-fluid might not always be acceptable in which case a seal 40 (FIG. 4) should be provided at the exit end of the tapered sleeve, to deny leakage into the process-fluid chamber. That seal also can provide protection against back-leakage of the process-fluid, out through the tapered sleeve unit, in the event that the shaft stops rotating. The barrier-liquid emerging into the exit-chamber 52 is collected and recirculated.

FIG. 4 also shows a drive-shaft 53 with a different type of bearing arrangement. Here, the bearings that carry the drive-shaft are provided entirely by the tapered sleeves. The compactness of the arrangement is apparent, and yet the bearings are of very high capacity. If the pump is driven by an electric motor, it will be understood just how close the motor can be placed to the impeller. This may be compared with conventional installations, where the motor can be a foot, or even more, back from the impeller.

It may be noted also that the mechanical seal 40 is only a tiny distance from the folded bearing. Therefore, the chance of the seal 40 being subjected to vibration or other abuse is minimised.

In FIG. 4, only the bearing 54 at the impeller end is folded: the other bearing 56 has just one interface. Of course, both could be folded if axial space were even tighter, although the designer should be careful not go below a prudent minimum bearing spread. In a case where a heavy radial load is placed on the drive-shaft (e.g from a belt drive), that would be a good reason for replacing the bearing 56 with a double or triple folded version, as described.

It will be noted that the barrier-liquid is supplied to the entry chamber 57 at the left end of the left bearing 56. The left bearing discharges the barrier-liquid into a middle chamber 58, form where it is picked up by the groove in the right bearing, i.e the folded bearing 54.

In order to promote even flow of the barrier-liquid, the designer might find it beneficial to make the turns of the grooves of differing dimensions. A turn at diameter D has a certain volume V, i.e the turn will hold a certain quantity of barrier-liquid: whereas a turn at diameter D/2 would have to be twice as deep, or twice as wide, for example, if that groove is to contain the same volume V. That is to say, the turns at the smaller diameters preferably should be of greater cross-sectional area than the turns at the larger diameters, for smooth even flow of the barrier-liquid along the grooves. As described in WO-95/35457, and also U.S. Pat. No. 5,827, 042, this may be accomplished by cutting the grooves a little deeper at the thin end of the cone.

FIG. 5 shows folded tapered-sleeve bearings installed as big-end bearings on the crankshaft of a reciprocating machine, such as a compressor. The two folded interfaces are provided by the built-up rings, as shown, which are assembled onto the crank-pin 59.

The two rotor rings 60 are biassed apart by means of a spring 62, the biassing force being reacted by thrust washers 63. Barrier-liquid is supplied via an internal conduit 64 in the crank-pin to the entry-mouths of the interfaces, and the liquid passes along the tapered interfaces, i.e along the grooves in the rotors, and then passes up a conduit in the connecting rod 65.

One of the aspects of conventional crankshaft design is that the crankpin and the webs are normally so highly stressed, and so tight for space, that the crankpin and the webs have usually had to be manufactured in the one piece of metal. Of course, this can be done, but still, specialised machining is required to grind and polish the crank-pins, and the presence of the webs means that the big-end bearings have to be split, and have to be assembled radially rather than axially onto the crankpin. In FIG. 5, because the required journal capacity can be achieved in such a small space envelope, the webs can be wide, and there is enough room to provide a means for fixing the webs to the crankpin in a manner that, though secure, permits disassembly. Therefore, the components of the big-end bearing need not be split, and can be assembled axially onto the crank pin. Thus, the compactness creates even more compactness, as the bearings can be designed purely as solid rings, not as rings made up of two pieces that have to be bolted together.

Arising from this aspect, other possible variations are available to the designer. FIG. 6 shows how a big-end bearing of very large journal capability can be accommodated in a very small space envelope. The capacity is large because of the large aggregate bearing area, and because the bearing is not split.

I claim:

1. A rotary-interaction apparatus, wherein:

the apparatus includes a pair of sleeves, comprising a rotor-sleeve and a stator-sleeve;

the apparatus includes a means for rotating the rotor-sleeve about an axis of rotation;

the rotor-sleeve is formed with a first-rotor-interface-surface, and the stator-sleeve is formed with a first-stator-interface-surface, which together define a first interface between the rotor-sleeve and the stator-sleeve, the said first interface being of a first tapered configuration;

the apparatus includes an entry-chamber, and a reservoir of a barrier-liquid, the entry-chamber being in liquid-flow-communication with the reservoir of barrier-liquid;

one of the interface-surfaces of the first interface is provided with a first-spiral-groove, having an entry-mouth in liquid-flow-communication with the entry-chamber, and having an exit-mouth;

the first-spiral-groove is so disposed in the interface-surface as to define plane lands of substantial width between adjacent turns of the groove, the lands being of such dimensions and configuration as to comprise, during rotation, a means for creating and supporting a hydro-dynamic film of barrier-liquid between the first-rotor-interface-surface and the first-stator-interface-surface;

the rotor-sleeve is formed with a second-interface-surface, and the stator-sleeve is formed with a second-interface-surface, which together define a second interface between the rotor-sleeve and the stator-sleeve, the said second interface being of a second tapered configuration;

one of the interface-surfaces of the second interface is provided with a second-spiral-groove, having an entry-mouth;

the apparatus includes a means for supplying barrier-liquid to the entry-mouth of the second-spiral-groove;

the second-spiral-groove is so disposed in the interface-surface as to define plane lands of substantial width between adjacent turns of the groove, the lands being of such dimensions and configuration as to comprise, during rotation, a means for creating and supporting a hydrodynamic film of barrier-liquid between the second interface-surfaces;

the first and second interfaces lie at least partially superimposed on each other in the axial sense, one interface lying radially outside the other interface;

the arrangement of the first and second interfaces being such that a straight line drawn normal to the axis and passing though a point on the first interface passes also through a point on the second interface.

2. Apparatus of claim 1, wherein the exit-chamber of the first groove is in liquid-flow-communication with the entry mouth of the second groove, whereby the barrier-liquid passes first through the first groove and then through the second groove.

3. Apparatus of claim 2, wherein the first and second spiral grooves are handed so as to convey the barrier-liquid, during rotation, from the reservoir progressively from groove to groove.

4. Apparatus of claim 3, wherein the apparatus incudes a means for conveying away barrier-liquid emerging from the exit-mouth of the second groove, and for conveying that barrier-liquid back into the reservoir of barrier-liquid, whereby the barrier-liquid is circulated and recirculated through the grooves.

5. Apparatus of claim 1, wherein the first interface lies radially inside the second interface.

6. Apparatus of claim 1, wherein the first interface is of right-conical form, having an included angle, and the second interface is of right-conical form, having an included angle substantially different from the included angle of the first interface.

7. Apparatus of claim 1, wherein:

the rotor-sleeve is formed with a third-interface-surface, and the stator-sleeve is formed with a third-interface-surface, which together define a third interface between the rotor-sleeve and the stator-sleeve, the said third interface being of a third tapered configuration;

one of the interface-surfaces of the third interface is provided with a third-spiral-groove, having an entry-mouth;

the apparatus includes a means for supplying barrier-liquid to the entry-mouth of the third-spiral-groove;

the third-spiral-groove is so disposed in the interface-surface of the third rotor-sleeve as to define plane lands of substantial width between adjacent turns of the groove, the lands being of such dimensions and configuration as to comprise, during rotation, a means for creating and supporting a hydrodynamic film of barrier-liquid between the third interface-surfaces;

the first and second interfaces lie at least partially superimposed on the third interface in the axial sense, one interface lying radially outside the other interface;

the arrangement of the first, second, and third interfaces being such that a straight line drawn normal to the axis and passing though points on the first interface and the second interface, passes also through a point on the third interface.

8. Apparatus of claim 7, wherein the spiral grooves are so handed and configured that barrier-liquid passes from first to second to third in sequence.

9. Apparatus of claim 1, wherein:

the rotor-sleeve comprises a unitary rotor component, and the first-rotor-interface-surface and the second-rotor-interface-surface are formed integrally thereupon;

the stator-sleeve comprises a unitary stator component, and the first-stator-interface-surface and the second-stator-interface-surface are formed integrally thereupon.

10. A rotary pump, which includes a rotary interaction apparatus having all the features of claim 1, wherein:

the pump has an impeller, and a drive-shaft for driving the impeller in rotation;

and the rotary-interaction apparatus comprises a seal for sealing process-fluid being pumped by the impeller.

11. Pump of claim 10, wherein the rotary-interaction apparatus comprises both a seal for sealing process-fluid being pumped by the impeller and a bearing for the shaft.

12. A rotary pump, which includes a rotary interaction apparatus having all the features of claim 1, wherein:

the pump has an impeller and a drive-shaft for driving the impeller in rotation; and the rotary-interaction apparatus comprises a bearing for the shaft.

13. Pump of claim 12, wherein the said rotary-interaction apparatus is located on the drive-shaft of the pump, and is axially hard up against, or closely adjacent to, the impeller.

14. Pump of claim 12, wherein:

the pump includes an auxiliary bearing;

the rotary-interaction apparatus and the auxiliary bearing are located-on the shaft in a spaced-apart relationship;

the rotary-interaction apparatus and the auxiliary bearing comprise the sole bearings for the drive-shaft, in that the drive-shaft is otherwise unconstrained by bearings.

15. Pump of claim 14, wherein the auxiliary bearing comprises an auxiliary pair of sleeves, comprising an auxiliary rotor-sleeve and an auxiliary stator-sleeve, having surfaces which together define an auxiliary surface-to-surface interface between them, which defines a corresponding hydrodynamic bearing relationship therebetween, the auxiliary interface being of a respective tapered configuration.

16. Pump of claim 15, wherein:

the pump includes a middle chamber located between the rotary-interaction apparatus and the auxiliary bearing;

the spiral groove of the auxiliary sleeves is so handed and configured as to convey barrier-liquid into the middle chamber;

and the spiral grooves of the apparatus are so handed and configured as to convey barrier-liquid out of the middle chamber.

17. A rotary machine, which includes a rotary interaction apparatus having all the features of claim 1;

the machine includes a shaft, which is co-axial with the apparatus;

the shaft is formed with an internal conduit;

and the internal conduit is arranged for conveying barrier-liquid from the reservoir to the entry-mouth of the first spiral groove internally along the shaft.

18. A rotary machine, which includes a left rotary interaction apparatus having all the features as claimed in claim 1, and includes a right rotary interaction apparatus having all the features as claimed in claim 1;

the machine includes a shaft, and the left and right rotary-interaction apparatuses lie in opposed in-line co-axial configuration upon the shaft;

the machine includes a middle chamber, and the apparatuses are arranged on the shaft so that the respective entry mouths of the first grooves of the left and right apparatuses both open into a middle chamber;

the reservoir of barrier liquid is in liquid-flow-communication with the middle chamber;

the respective spiral grooves of the left and right apparatuses are so handed and configured as to drive barrier liquid, during rotation, the left apparatus to the left and the right apparatus to the right.

19. Apparatus of claim 1, wherein the spiral grooves are formed each in the respective rotor-interface-surfaces, and the respective stator-interface surfaces are plain and ungrooved.

20. A rotary-interaction apparatus, comprising:

a rotor sleeve having a central axis and a plurality of first axially tapered surfaces each arranged surrounding said central axis;

a stator sleeve having a plurality of second axially tapered surfaces arranged surrounding said central axis;

said rotor sleeve and said stator sleeve at least partially axially overlapping along said central axis to closely mate said plurality of first tapered surfaces with said plurality of second tapered surfaces to define a plurality of interfaces;

at least one of the said first and second tapered surfaces of each of said interfaces having a spiral groove surrounding said central axis and having opposite open ends at axial ends of said interface;

and at least one of said interfaces extending radially outwardly from the central axis further than another of said interfaces.

21. Apparatus of claim 20, wherein the grooves of said interfaces define fluid flow paths progressing in an axial direction, and said flow paths reverse axial direction at least once between two of said interfaces.

22. Apparatus of claim 21, wherein said plurality of interfaces are at least partially overlapping along said central axis.

23. Apparatus of claim 21, wherein said fluid flow paths of said two interfaces are flow connected in series.

24. Apparatus of claim 23, further including a pressure relief valve located at a position along the flow paths of said grooves and urged to close at least one flow path, and openable to open said at least one flow path when pressure within said at least one flow path reaches a preselected pressure level.

25. Apparatus of claim 20, wherein said plurality of interfaces are each shaped as a rightconical form with an included angle to said central axis, and at least two of said interfaces have different included angles to the central axis.

26. A Rotary pump, which includes a rotary interaction apparatus having all the features of claim 20, wherein:

the pump has an impeller, and a drive-shaft for driving the impeller in rotation;

and the rotary interaction apparatus comprises a seal for sealing process-fluid being pumped by the impeller.

27. Pump as claimed in claim 26, wherein the rotary-interaction apparatus includes an entry-chamber in fluid communication with a least one of said spiral grooves, and a supply of a barrier-liquid, the entry-chamber being in liquid-flow-communication with the supply of barrier-liquid.

28. Pump of claim 27, wherein the rotary-interaction apparatus includes a means for conveying away barrier-liquid emerging from said at least one of said grooves, and for conveying that barrier-liquid back into the supply of barrier-liquid, whereby the barrier-liquid is circulated and recirculated through said at least one of said grooves.

* * * * *